United States Patent [19]

Favicchia

[11] Patent Number: 5,454,832

[45] Date of Patent: Oct. 3, 1995

[54] HOOF CRACK STABILIZER

[76] Inventor: John E. Favicchia, 24 Bloomer Rd., North Salem, N.Y. 10560

[21] Appl. No.: 241,608

[22] Filed: May 11, 1994

[51] Int. Cl.[6] ................................................... A61B 17/00
[52] U.S. Cl. ............................................ 606/212; 24/486
[58] Field of Search ............................... 606/212; 24/486

[56] References Cited

U.S. PATENT DOCUMENTS

| | | | |
|---|---|---|---|
| 376,441 | 1/1888 | Hughes | 606/212 |
| 408,080 | 7/1889 | Carroll | 606/212 |
| 652,796 | 7/1900 | Mackey | 606/212 |
| 676,303 | 6/1901 | Cramer | 24/486 X |
| 1,163,617 | 12/1915 | Dresser | 606/212 |
| 3,341,909 | 9/1967 | Havener | 24/486 |

FOREIGN PATENT DOCUMENTS

| | | | |
|---|---|---|---|
| 417110 | 8/1925 | Germany | 606/212 |
| 9234 | of 1900 | United Kingdom | 606/212 |

*Primary Examiner*—Peter A. Aschenbrenner
*Attorney, Agent, or Firm*—Kane, Dalsimer, Sullivan, Kurucz, Levy, Eisele and Richard

[57] ABSTRACT

An assembly is used to compressibly stabilize a crack in the hoof of a hooved animal to protect the animal from further damage due to stress on the cracked hoof.

5 Claims, 1 Drawing Sheet

HOOF CRACK STABILIZER

BACKGROUND OF THE INVENTION

1. Field of the Invention

The invention relates to the care of hoof cracks in hooved animals.

2. Brief Description of the Prior Art

Hooved animals such as cows, horses and the like are susceptible to many diseases and injuries related to defects in their hooves. For example, the hoof of the horse is subject to quarter cracks, heel cracks and toe cracks. The location of the crack is what designates its name.

The horse hoof (ungula) is the cornified epidermis of the animal's foot, comprised of a wall, sole and frog. It is non-vascular and lacks nerve endings. The wall is structured of keratinized epithelial cells, solidly cemented with keratin a scleroprotein rich in sulfur containing amino acid residues. The hoof wall, which overlies the more sensitive lamellar corium tissue of the foot, contains about 25 percent water and small amounts of minerals such as calcium, magnesium, zinc, copper and manganese making it a relatively dense material.

The hoof wall (paries) is composed of three layers, the outer layer being the periople and the stratum tectorium which gives the wall its glossy appearance and protects the hoof from dehydration. Underlying the stratum tectorium is the middle layer, which is the densest portion of the hoof wall and overlies the epidermal laminae or inner layer.

The ground surface of the hoof is arbitrarily divided into the toe, quarter or heel zones referred to above, and so referred to in designating the location of hoof cracks.

The most common causes of hoof cracks are trauma, infection of the underlying sensitive laminae, poor hoof and leg conformation, poor trimming or shoeing and invasion of the white line (the juncture of the hoof wall and the sole), by bacteria, fungus or mold. Other causes can be attributed to drying or excessively thin walls or injury to the coronary band. Once the crack occurs, the natural expansion and contraction of the hoof, due to the loading and unloading of the foot in motion, causes the hoof wall to pinch and irritate the underlying sensitive laminae within the hoof capsule. Lameness may not occur immediately but inevitably ensues.

Over the years, this problem has been handled several ways, depending on location of the crack.

In one common expedient, metal plates have been placed across the cracks and fastened to the hoof wall with sheet metal screws. This does not pull the crack together but does stabilize it until the screws loosen due to concussion or normal hoof growth. It also makes it possible for the underlying sensitive laminae to be invaded when drilling the holes for the screws thus causing the hoof to abscess, further exacerbating the problem.

The preferred treatment for toe cracks which do not extend into the coronary band has comprised burning or grooving a triangular pattern in the hoof surface across the upper reaches of the crack, with the apex of the triangle sitting on a groove or burn transverse to the crack. This is to limit extension of the crack. The hoof wall is then trimmed away on either side of the crack at the ground surface. A shoe is then applied to the hoof to remove weight bearing at the toe site of the crack. The area between the shoe and the injury site must be cleaned daily (usually with a hacksaw blade) to avoid injury. Eventually, and after a number of re-shoeings, the hoof grows out, eliminating the crack (the hoof wall grows downward at a rate of about one-fourth inch per month, depending on temperature and humidity of the environment.

Quarter cracks have been similarly treated, but with installation of half-bar shoes with the bar on the heel of the affected side pressing with ⅛ to ¼ inch of pressure upon the frog. This relieves pressure on the hoof wall at the site of injury. Daily cleaning of the clipped site between the shoe and the injury site are likewise mandatory to avoid infection. Heel cracks, similarly treated usually do not require special shoeing.

Cracks have also been stitched together with wire, again opening the possibility of penetrating into the underlying sensitive laminae when drilling holes on either side of the crack to allow for the passing of the wires across the crack. When the wires are pulled or twisted in an effort to close or stabilize the crack they invariably pull through the fibers of the hoof wall and are ineffective, even causing greater injury.

Recently, glue-on patches have been introduced but leave much to be desired. Often the glue fails if the area is not prepared "correctly" which, under most conditions, is near impossible. Since the patches are a plastic material, they are subject to movement and cannot be used to pull the crack together.

A state-of-the-art treatment for treating toe and quarter cracks in horse hooves has been more complex. The crack is debrided with an electric cast cutter, a hoof groover, a firing iron or a motorized burr to enlarge it down to the sensitive laminae. The opening is made triangular, with the base of the triangle at the layer of the sensitive laminae. Holes are drilled on both sides of and parallel to the crack. The holes are threaded with umbilical tape or stainless steel wire. Then, the crack is filled with epoxy glue or a like plastic and the crack reduced by pulling and tensioning the tape or wire like a shoelace. Corrective shoes as described above are also applied to reduce the ground-to-hoof pressure on the site of injury. The procedure, described by Evans et al. in JAVMA, Vol. 148 [1966] at Page 355 is not without hazards. One problem is that the heat generated by the epoxy glue curing (or most plastic adhesives) can destroy tissue beneath it, resulting in abscess formation.

In actual use on horses with cracks that were chronic and long standing, the assembly of the present invention has overcome all the problems mentioned above. While other remedies proved ineffective, the assembly of the invention eliminated expansion and contraction of the crack so that the soreness and inflammation to the underlying sensitive laminae were gone in a matter of days and the horses were sound in a short time.

In cases where the sensitive laminae had been irritated to the extent that there was an infection, the crack was debrided and treated with antiseptics, packed with cotton and the assembly of the invention was put in place. This allowed the crack to be treated daily since the cotton was exposed and could be saturated with antiseptics and the wound could drain. This was also the case with cracks that had been invaded by fungus or mold. In all cases the cracks, after several shoeings, had grown down and normal hoof growth, which starts at the hair line, had begun and the hoof had returned to its normal state.

SUMMARY OF THE INVENTION

The invention comprises, an assembly for compressibly sustaining joinder of separated segments of the wall of an animal hoof, which comprises;

(a) an elongate bridge member having (i) a first end;
(ii) a second end;
(iii) an elongate body between the first and second ends;
(b) a first leg comprising an elongate body having a first leg first end and a first leg second end, said second end including a keratin penetrating point;
(c) a second leg comprising an elongate body having a second leg first end and a second leg second end, said second leg second end including a planar surface;
said first and second legs being spaced from the bridge member and extending away from the bridge member in planes transverse to the axial plane of the bridge member; said first ends of the first and second legs being spaced apart from each other a distance about equal to the length of the bridge member;
said keratin penetrating point of the first leg being in the same plane as the planar surface of the second leg; and
(d) means associated with the planar surface for adjustably securing the assembly to the animal hoof. The assembly of the invention does not require surgical skills for application and use.

DETAILED DESCRIPTION OF THE PREFERRED EMBODIMENTS OF THE INVENTION

Those skilled in the art will gain an appreciation of the invention from a reading of the following description of preferred embodiments of the invention when read in conjunction with a viewing of the accompanying drawings of FIGS. 1–5, inclusive.

Figure 1:
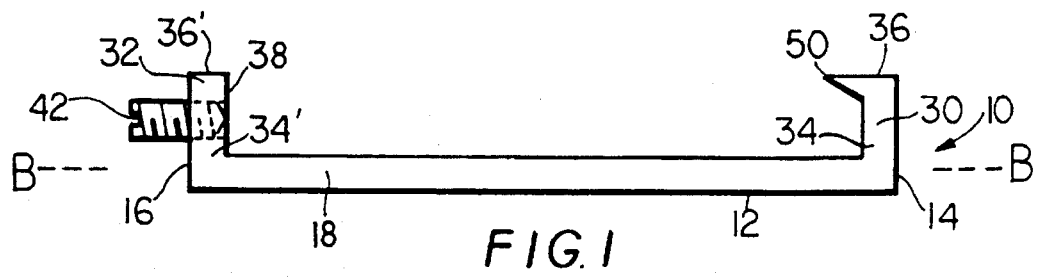
FIG. 1 is a side-view of the assembly of the invention.

Referring first to FIG. 1, there is seen a side view, of an embodiment assembly 10 of the invention. The assembly 10 comprises an elongate bridge member 12 having a first end 14 and a second end 16 with an elongate body 18 between the ends 14,16. The body 18 is a flat strip, although it may have any cross-sectional configuration including that of a rod having an upper planar surface and a lower planar surface bounded by a peripheral edge. The body 18 between ends 14,16 has a substantially straight axis (broken line B—B) extending between the downward bend at end 14 to the downward bend at end 16. The ends 14, 16 are integral parts of the bridge member 12 and mark the outer limits of the overall length of assembly 10 at the bridge 12 end thereof. The bridge member 12 of assembly 10 preferably provides the maximum dimensions, lengthwise, of the assembly 10.

Assembly 10 legs 30, 32 are elongate, nonserrated (smooth, untoothed) members, equal in length and extending outwardly, parallel to each other and at a 90° angle to the line B—B. The legs 30, 32 each have a first end 34 or 34' and a second end 36 or 36'. The second end 36 includes keratin penetrating point 50 which will be described in greater detail hereinafter. The point 50 is directed along a plane parallel to the axial line B—B of member 12.

Legs 30, 32 are integrally connected through their respective first ends 34, 34' to the bridge member 12 ends 14, 16, respectively.

As may be seen in FIG. 1 the legs 30, 32 extend in a direction away from the bridge member 12 in separate planes, each plane being transverse to the axial plane along line (B—B) of the bridge member 12 and parallel to each other. The ends 34, 34' are spaced apart from each other a distance about equal to the length of body 18 of bridge member 12 forming an acute angle with the bridge member 12. The angle is advantageously within the range of from about 65° degrees to about 108° degrees, preferably 90°.

Figure 5:
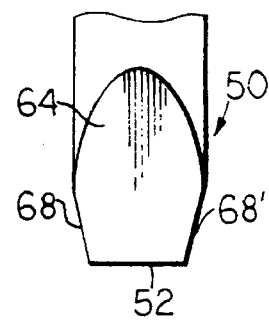
FIG. 5 is a side view of a preferred keratin penetrating point used in the assembly of the invention.

The ends 36, 36' are spaced apart from each other a distance about equal to the distance between ends 34, 34'. The end 36 includes a keratin penetrating point 50. Keratin is a viscoelastic material, and penetration is effectively achieved with, for example, a trochoid point. However, a blade point 52 as shown in FIG. 5 includes three beveled faces 64, 68, 68' for cutting keratin tissue as insertion proceeds. Cutting the tissue (in contrast to tearing it as occurs from a driven nail) anchors the point with more resistance to pull-out.

Point 52 is a keratin cutting wedge made by a bevel face 64 formed by grinding the point 50 at an angle of about 145° to 155°. A sharp edge 52 is formed by an intersecting face 68, 68' which are bevel cuts of about 128° to 135°. Advantageously the length of faces 68, 68' is about 0.10 inches (±0,005"). Advantageously the face 64 has a length of about 0,046 inches (±0.010"). The point 52 shown in FIG. 5 facilitates cutting into keratin surfaces, provides a stable surface for contact and facilitates the making of a bore in the keratinous middle layer to hold the assembly 10 leg 30 described above.

Figure 2:
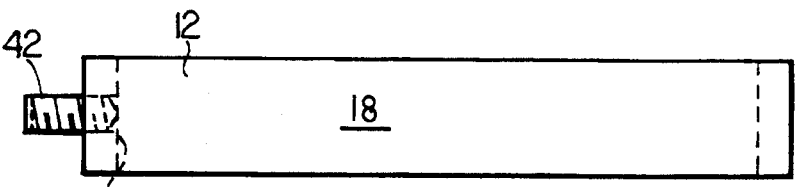
FIG. 2 is a top view of the assembly shown in FIG. 1 before mounting on the hoof.

FIG. 2 is a top view of the assembly 10 of the invention and shows further detail of the bridge member 12 and body 18.

Figure 3:
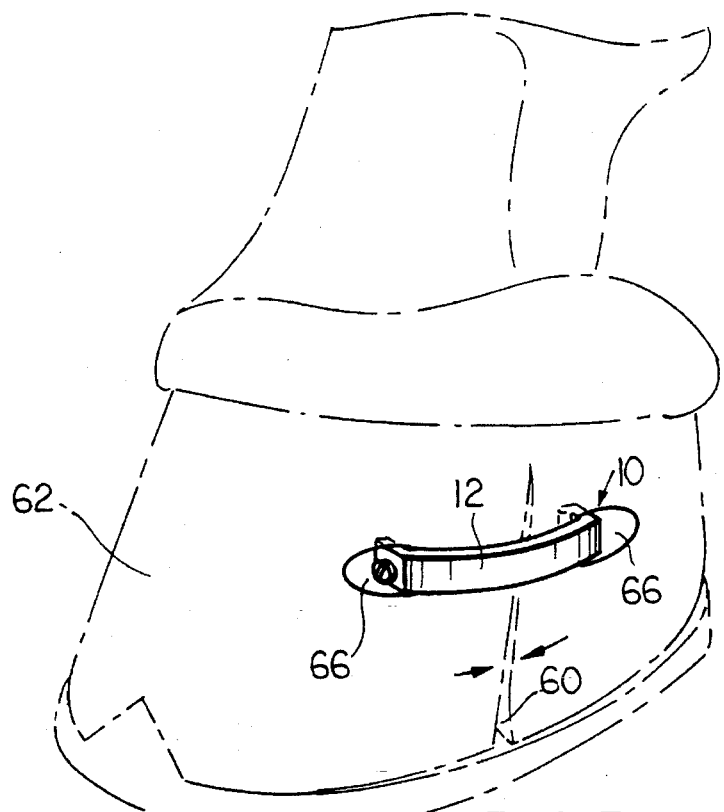
FIG. 3 is a view-in-perspective of an assembly of the invention placed in use on the hoof of a horse.
Figure 4:
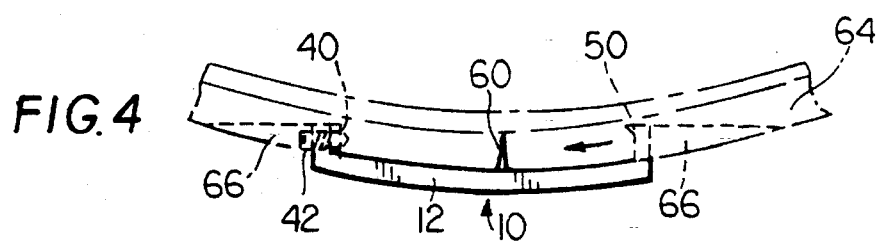
FIG. 4 is a view from above of the assembly shown in use in the FIG. 1.

The method of the invention will now be described with reference to the drawings of FIG. 3 and 4, inclusive. Referring first to FIG. 3, there is seen a view-in-perspective of assembly 10, mounted at the site of a quarter crack 60 in a hoof. Keratin penetration point 50 (not seen in FIG. 3; see FIG. 4) has made a penetration in the middle layer of the hoof, parallel to the middle layer stratum. The legs 30, 32 and bridge 12 straddle a transverse crack 60 of a hoof 62. The crack 60 has separated the hoof segments at the crack interfaces. As shown in FIG. 4, point 50 of assembly 10 has been inserted in the direction of the arrow, the keratin penetration point 50 of leg 30 ends 34 having penetrated into the keratinous middle layer 64 in a direction transverse to the length of crack 60.

The leg 32 sets in a recess 66 cut to expose the middle layer 64 and has a planar surface 38 brought adjacent to and facing the flattened, cut surface 40 of middle layer 64. A set screw 42 exemplifying an adjustment means is mounted in the leg 32 with axial movement parallel to the line B—B and movable to secure the assembly 10 in place (as shown in FIG. 3 and 4) on the hoof 62. By tightening the set screw 42 against surface 40 of middle layer 64, the crack 60 can be compressed and the separated hoof segments held in a stable spatial relationship, even when the animal places full weight on the foot. Since pressure is exerted wholly within the middle layer 64 and in a direction transverse to the crack 60, further damage to the hoof is avoided. It is a safety factor since penetration of the underlying sensitive laminae is avoided.

As mentioned above, the bridge member 12 can be essentially straight, along axial line B—B. However, as shown in FIG. 4, the bridge member can be slightly convex on the inner aspect (presenting a curvilinear axis B—B) so as to conform it to the outer curvature of the hoof. This curvature can also be accomplished on the anvil to suit the particular hoof.

The method of the invention and the procedure by which the assembly 10 of the invention is applied to the hoof is as follows:

1. Recesses 66 are let into the hoof wall by using a Moto-tool (Dremel Manufacturing Company, Racine, Wis.) or other power tool, with the proper size drum cutter. As shown in FIG. 4, these recesses 66 are equally spaced on either side of the crack and the distance between them should be about equal to the length of bridge member 12 (about 1¾ inches is optimum). The recesses are along the length of the crack 60. Note that the direction of the recess is along the middle layer of the hoof, paralleling it so as not to breach the underlying sensitive laminae.

2. The leg 30 of the assembly 12 which has the penetration point 50 on it is inserted into one of the recesses 66 and tapped with a horseshoer's driving hammer until the point 50 penetrates the hoof middle layer (parallel to the layer) and allows the leg 32 with the set screw 42 to drop into the other recess 66.

3. The set screw 42 is then tightened to compress and close the crack. This will eliminate expansion at that point so that new hoof will not be compromised and will grow downward in a normal fashion.

4. The recesses 66 can be filled with any number of hoof repair materials that are on the market, if the crack is not draining. A representative material is sold by H. D. Justi Company, Philadelphia, Pa. The assembly 10 can also be covered with hoof repair material to improve the cosmetic appearance until normal hoof is grown down.

The assembly 10 remains in place as continuing support, until such time that it ends up at the bottom of the foot, due to hoof growth, and is removed during the trimming of the hoof which is usual in preparation for shoeing.

The set screw 42 is a preferred means of securing the assembly 10 to the hoof, but not the only means. For example, a wedge can be inserted between surface 38 and the hoof middle layer surface 40. With either means, a bias force is exerted within the hoof middle layer, causing a compression of the intervening crack 60 interfaces (see the arrows pointing toward the crack line 60), holding closed the crack 60 under pressure. The assembly 10 can be left in place until the hoof grows sufficiently to escape the crack.

The assembly 10 may be fabricated from any material such as steel, titanium, a stainless steel, aluminum or a synthetic polymeric resin such as a polycarbonate.

Those skilled in the art will appreciate that many variations and departures may be made from the above-described preferred embodiments of the invention without departure from the scope of the following claims. For example, although the assembly 10 described above is a continuous, unitary and uninterrupted length of a flat member bent to meet the desired construction and configuration, assemblies of the invention may be fabricated from continuous, flat strips with planar surfaces or they may be built up from separate structural components. Although the embodiment assembly 10 as shown in the accompanying drawings has flat legs 30, 32 legs may advantageously be round, a triangular, elliptical or other cross-sectional configuration. Preferably however, the assembly of the invention is a unitary, continuous length, having a thickness within the range of from about 0.020" to about 0.250"; most preferably about 0.050".

The dimensions of the assembly 10 of the invention may also be widely varied to meet specific crack repairs. As an example, the leg 30, 32 length may be within the range of from about 0.2 to about 0.45 inches. The legs 30,32 will generally be equal in length, but need not be.

The bridge 12 of the assembly 10 may vary widely in length and is governed only by the availability of an insertion site on each side of the crack to be compressed.

What is claimed is:

1. An assembly for compressibly sustaining joinder of separated segments of the wall of an animal hoof, which comprises;

(a) an elongate bridge member having
      (i) a first end;
      (ii) a second end;
      (iii) an elongate body between the first and second ends;

said bridge member being curvilinear with a convex surface conforming to the shape of the wall of the hoof;

(b) a first leg comprising an elongate, non-serrated body having a first leg first end connected to the bridge member first end and a first leg second end, said second end including a keratin penetrating point projecting along a plane parallel to the bridge member;

(c) a second leg comprising an elongate, non-serrated body having a second leg first end connected to the bridge member second end and a second leg second end, said second leg second end including a planar surface, said first and second legs extending away from the bridge member in planes transverse to the axial plane of the bridge member; said first ends of the first and second legs being spaced apart from each other a distance about equal to the length of the bridge member;

said keratin penetrating point of the first leg being in the same plane as the planar surface of the second leg; and (d) means mounted on the second leg for adjustably securing the assembly to the animal hoof.

2. The assembly of claim 1 wherein the keratin penetrating point has a blade point.

3. The assembly of claim 1 wherein the means for adjustably securing the assembly is a movable set screw mounted in the second leg.

4. A process for fixing a crack in the wall of an animal hoof, which comprises:

I. providing a compression assembly, which comprises:
      (a) an elongate bridge member having
         (i) a first end;
         (ii) a second end;
         (iii) an elongate body between the first and second ends;
      (b) a first leg comprising an elongate, non-serrated body having a first leg first end connected to the bridge member first end and a first leg second end, said second end including a keratin penetrating point;
      (c) a second leg comprising an elongate, non-serrated body having a second leg first end connected to the bridge member second end and a second leg second end, said second leg second end including a planar surface, said first and second legs extending away from the bridge member in planes transverse to the axial plane of the bridge member; said first ends of the first and second legs being spaced apart from each other a distance about equal to the length of the bridge member;

said keratin penetrating point of the first leg being in the same plane as the planar surface of the second leg and projecting in a plane parallel to the axial line of the bridge member;

II. forming a first recess in the hoof wall on a plane parallel to and within the hoof wall middle layer, at a point between the ends of the crack and on a first side of the crack;

III. forming a second recess in the hoof wall on a plane parallel to and within the hoof wall middle layer, at a point between the ends of the crack and on a second side of the crack;

IV. positioning the provided assembly on the outer surface of the hoof, astraddle the crack with the first leg in the first recess on one side of the crack and the second leg in the second recess on the other side of the crack;

V. inserting the keratin penetrating point of the positioned assembly into the middle layer of the hoof parallel to the middle layer of the hoof; and VI. forcing the planar surface of the second leg second end against the middle layer of the hoof;

whereby each segment of hoof adjacent the crack is placed under tension and biased towards each other.

5. The method of claim 4 wherein the forcing is carried out by adjustment of a set screw in the second leg.

* * * * *